US009465409B2

(12) United States Patent
Wu et al.

(10) Patent No.: US 9,465,409 B2
(45) Date of Patent: Oct. 11, 2016

(54) DOCKING STATION

(71) Applicant: Acer Incorporated, New Taipei (TW)

(72) Inventors: Ming-Yen Wu, New Taipei (TW);
Yan-Lin Kuo, New Taipei (TW);
Cheng-Hung Chen, New Taipei (TW);
Shao-Huai Tsai, New Taipei (TW)

(73) Assignee: Acer Incorporated, New Taipei (TW)

( * ) Notice: Subject to any disclaimer, the term of this patent is extended or adjusted under 35 U.S.C. 154(b) by 57 days.

(21) Appl. No.: 14/662,244

(22) Filed: Mar. 19, 2015

(65) Prior Publication Data
US 2015/0268696 A1    Sep. 24, 2015

(30) Foreign Application Priority Data

Mar. 19, 2014  (TW) .............................. 103204674 U

(51) Int. Cl.
G06F 1/16    (2006.01)
(52) U.S. Cl.
CPC ........... G06F 1/1632 (2013.01); G06F 1/1626 (2013.01); G06F 1/1669 (2013.01); G06F 1/1681 (2013.01)
(58) Field of Classification Search
CPC .... G06F 1/1632; G06F 1/165; H05K 1/0271
USPC ............ 248/346.03, 309.1, 426.1, 41.2, 917,
248/918, 205.1, 309.4; 361/679.43, 679.01,
361/679.55, 679.26, 679.03, 679.56,
361/679.41, 679.44, 679.4, 679.57, 679.02,
361/679.59, 679.22, 679.23, 679.09,
361/679.31; 345/107, 8, 173, 32, 208, 102,
345/100, 694, 163; 455/562.1, 41.2, 456.1,
455/41.1, 456.3, 557, 575.1, 552.1, 74,
455/74.1; 710/303, 304, 1, 62
See application file for complete search history.

(56) References Cited

U.S. PATENT DOCUMENTS

| 6,765,792 B2 * | 7/2004 | Yin ........................ G06F 1/1632 361/679.23 |
| 2002/0030970 A1 * | 3/2002 | Kim ...................... G06F 1/1632 361/679.43 |
| 2012/0188697 A1 * | 7/2012 | Chen ..................... G06F 1/1632 361/679.09 |

* cited by examiner

Primary Examiner — Hung Duong
(74) Attorney, Agent, or Firm — Jianq Chyun IP Office

(57) ABSTRACT

A docking station for installing a portable electronic device is provided. The portable electronic device includes a display surface and at least one slot located at one side of the display surface. The docking station includes a supporting structure, at least one hook, and at least one first magnetic element. The supporting structure includes a body and a shell. The shell covers the body. The hook is disposed on the body and extrudes out of the supporting surface of the shell. The first magnetic element is disposed on the body and located in the shell. The hook is adapted to inlay in the slot and the first magnetic element is adapted to attract the portable electronic device, such that the portable electronic device is fixed on the supporting structure.

10 Claims, 5 Drawing Sheets

DOCKING STATION

CROSS-REFERENCE TO RELATED APPLICATION

This application claims the priority benefit of Taiwan application serial no. 103204674, filed on Mar. 19, 2014. The entirety of the above-mentioned patent application is hereby incorporated by reference herein and made a part of this specification.

BACKGROUND OF THE DISCLOSURE

1. Field of the Disclosure

The disclosure relates to a docking station, and relates particularly to a docking station of a portable electronic device.

2. Description of Related Art

Along with the rapid developments in industrial technology, portable electronic devices, for example, a tablet PC or a smart phone and the like, have become widely used due to their advantages such as allowing a user to carry and operate easily. Currently, due to a large portion of portable electronic devices do not have a supporting station, a user is required to operate the portable electronic device in a hand held manner, causing a burden to the user when operating for extended periods of time.

Therefore, in some current designs, a portable electronic device will be arranged with a docking station. The docking station may provide placement for the portable electronic device and is electrically connected to the portable electronic device.

Current commonly seen docking stations may roughly be divided into torque docking stations and non-torque docking stations. Taking a torque docking station as an example, FIG. 1 is a schematic diagram of a conventional torque docking station. FIG. 2 is a partial schematic diagram of a hooking structure of FIG. 1. FIG. 3 is a partial side view of a torque docking station of FIG. 1. Referring to FIG. 1 through FIG. 3, a portable electronic device 10 may be disposed on a torque docking station 100 pluggablly through the hooking structure 110. Generally speaking, the hooking structure 110 may include a first hook 111 and a second hook 112. When the portable electronic device 10 is installed with the torque docking station 100, the second hook 112 will correspondingly actuate to latch the portable electronic device 10 on to the torque docking station 100. When a user desires to separate the portable electronic device 10 and the torque docking station 100, the connecting relationship between the second hook 112 and the portable electronic device 10 must be released first to smoothly unplug the portable electronic device 10 from the torque docking station 100.

In order to prevent the portable electronic device 10 disposed on the torque docking station 100 from producing swinging during an operation process, a supporting wall 120 is disposed at a joining point corresponding to the portable electronic device 10 and the torque docking station 100. Although disposing the supporting wall 120 assists in improving the swinging that may be produced after the portable electronic device 10 and the torque docking station 100 are joined, however the flexibility of the exterior design of the torque docking station 100 and the installation direction of the portable electronic device 10 is restricted.

SUMMARY OF THE DISCLOSURE

The disclosure provides a docking station, having a simplified external appearance and is able to firmly fix a portable electronic device on the docking station.

The docking station of the disclosure is used for installing a portable electronic device. The portable electronic device has a display surface and at least one slot located at one side of the display surface. The docking station includes a supporting structure, at least one hook and at least one first magnetic element. The supporting structure includes a body and a shell. The shell covers the body. The hook is disposed on the body, and extruding out of a supporting surface of the shell. The magnetic element is disposed on the body and located in the shell. The hook is adapted to inlay in the slot, the first magnetic element is adapted to attract the portable electronic device, such that the portable electronic device is fixed on the supporting structure.

Based on the above, the docking station of the disclosure includes at least one hook and at least one magnetic element, wherein the hook and the magnetic element are disposed on a body and the hook extrudes out of a shell covering the body. When the portable electronic device inlays together with the hook of the body via a slot, the first magnetic element attracts the portable electronic device. That is to say, the portable electronic device may be firmly installed on the docking station through the hook and the first magnetic element.

BRIEF DESCRIPTION OF THE DRAWINGS

The accompanying drawings are included to provide a further understanding of the disclosure, and are incorporated in and constitute a part of this specification. The drawings illustrate embodiments of the disclosure and, together with the description, serve to explain the principles of the disclosure.

DESCRIPTION OF THE EMBODIMENTS

Figure 1:
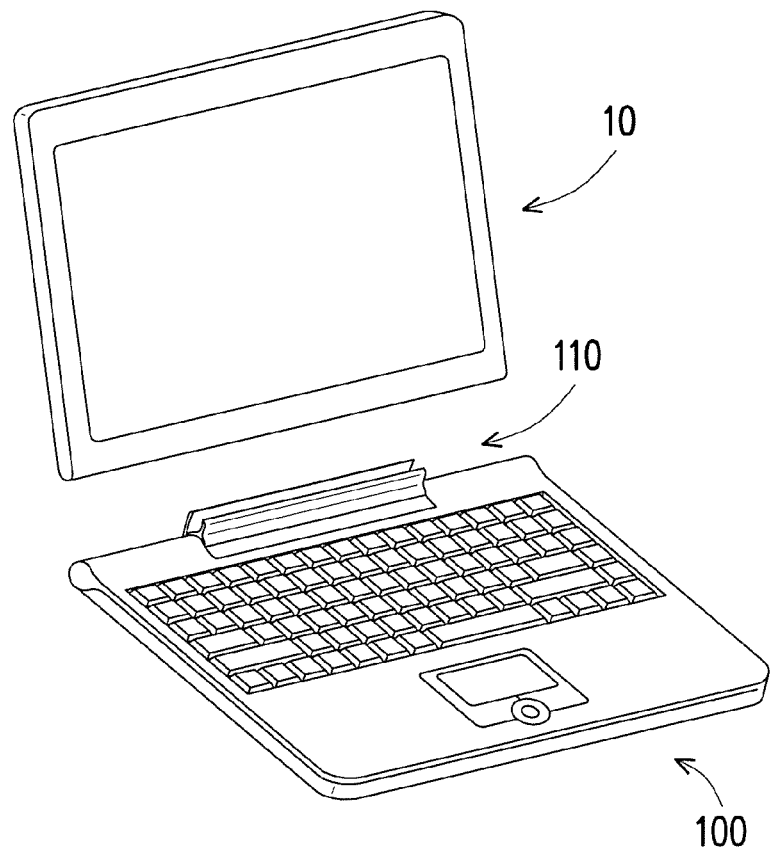
FIG. 1 is a schematic diagram of a convention torque docking station.
Figure 2:
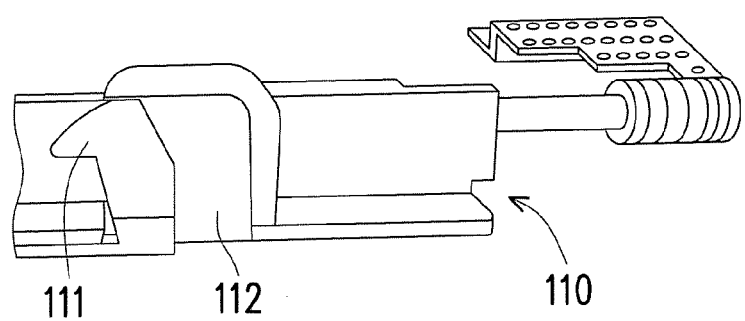
FIG. 2 is a partial schematic diagram of a hooking structure of FIG. 1.
Figure 3:
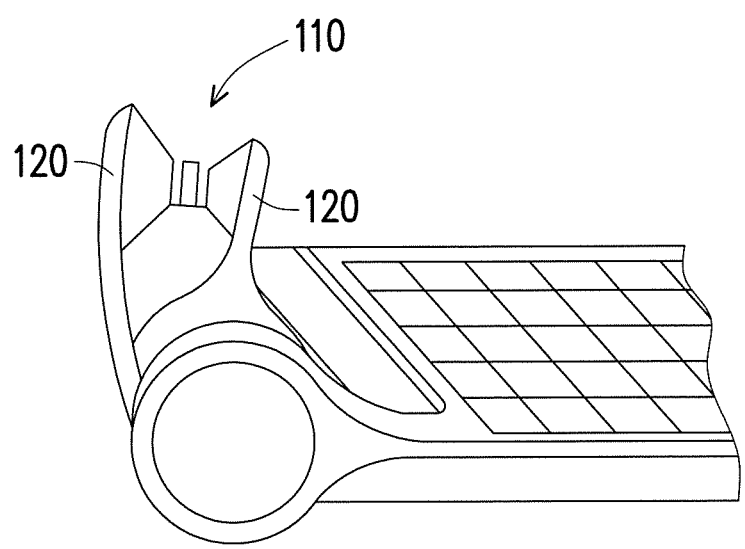
FIG. 3 is a partial side view of a torque docking station of FIG. 1.

Reference will now be made in detail to the present preferred embodiments of the disclosure, examples of which are illustrated in the accompanying drawings. Wherever possible, the same reference numbers are used in the drawings and the description to refer to the same or like parts.

Figure 4:
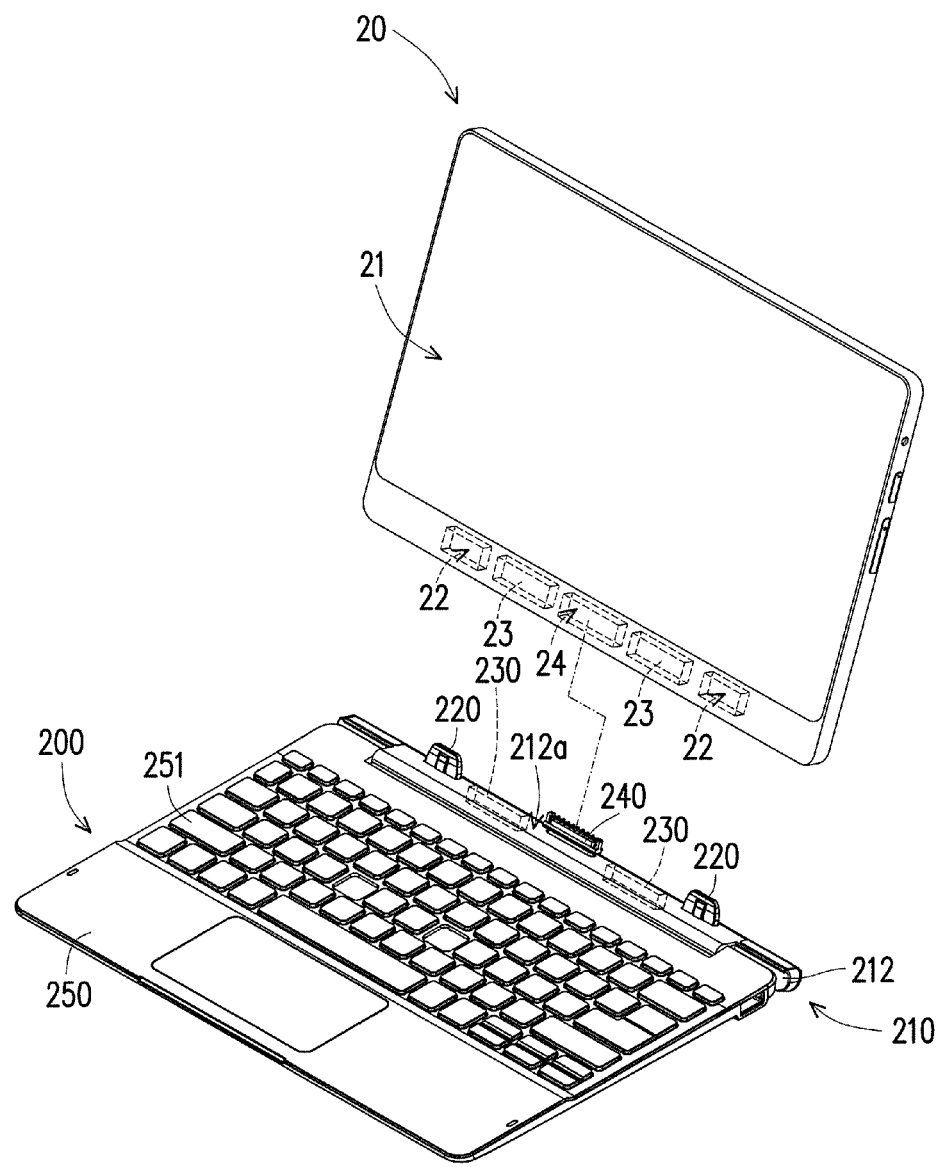
FIG. 4 and FIG. 5 are schematic diagrams of a docking station and a portable electronic device before and after installation respectively.
Figure 5:
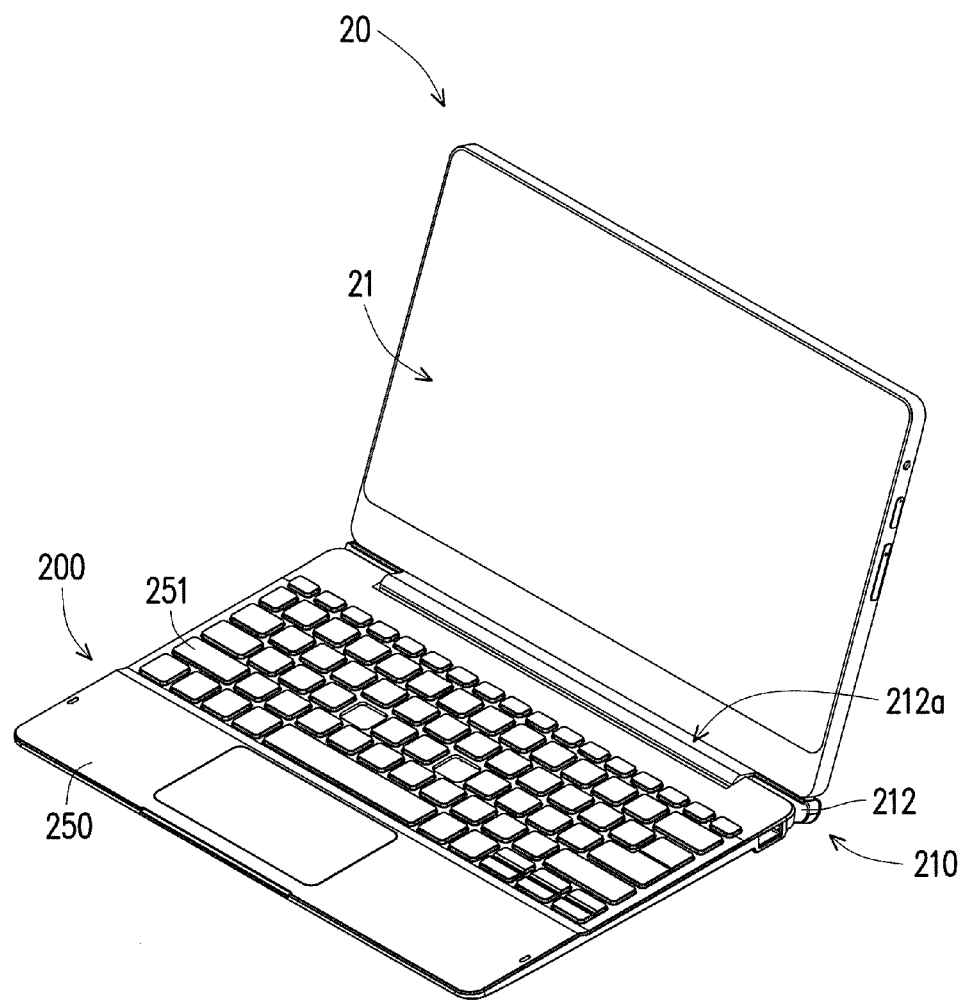
Figure 6:
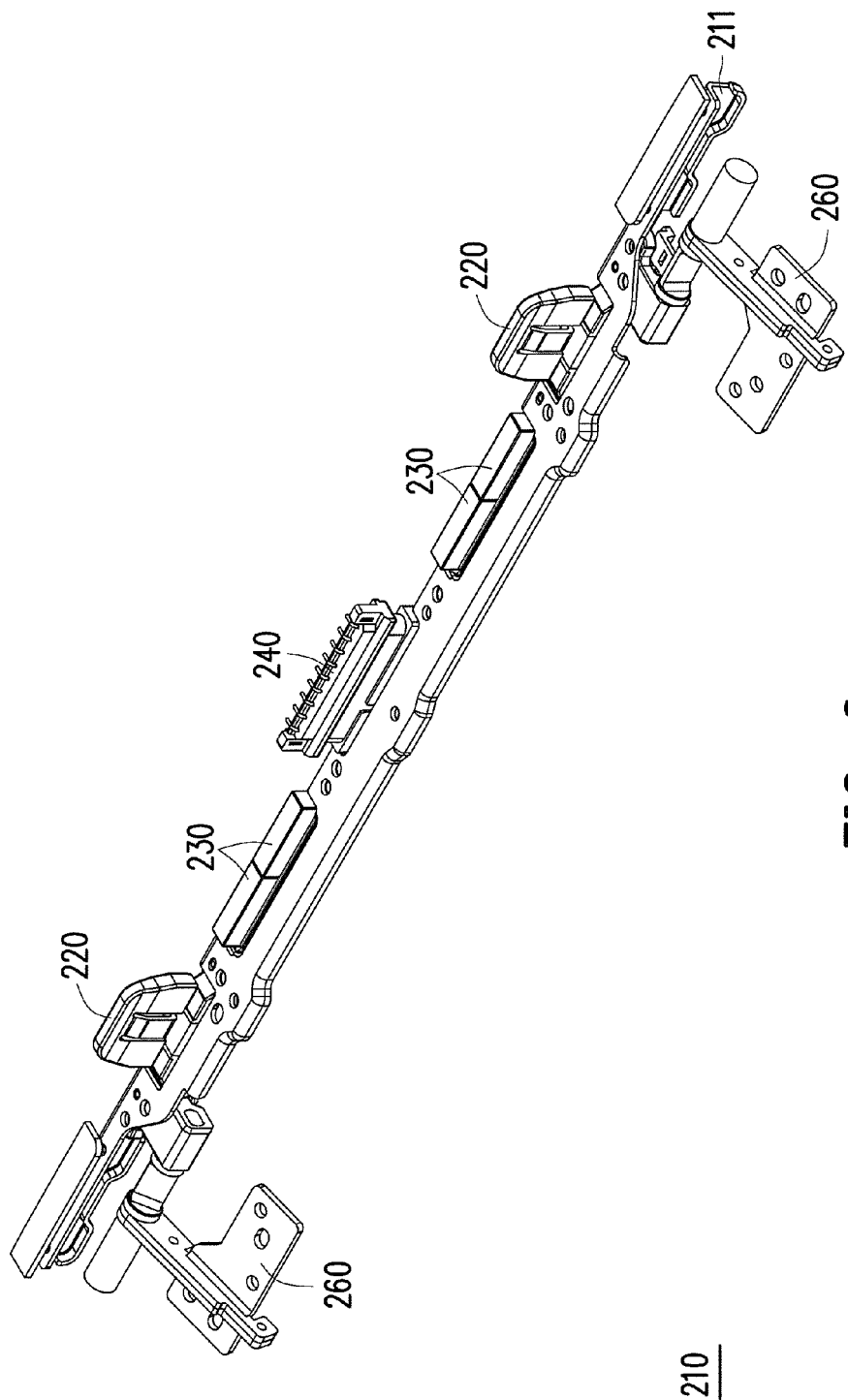
FIG. 6 is a schematic diagram of a carrying structure of FIG. 4.

FIG. 4 and FIG. 5 are schematic diagrams of a docking station and a portable electronic device before and after installation respectively. FIG. 6 is a schematic diagram of a carrying structure of FIG. 4, wherein to make the description and display more clear, a shell 212 is omitted in FIG. 6. Referring to FIG. 4 through FIG. 6, in the present embodiment, a docking station 200 for installing a portable electronic device 20 is provided, wherein the portable electronic device 20, for example, is a tablet PC having a display surface 21 and at least one slot 22 located at one side of the display surface 21. Below, an example with two slots 22 is described, however the disclosure is not limited thereto.

The docking station 200 may include a supporting structure 210, at least one hook 220 and at least one first magnetic element 230. Below, an example with two hooks 220 and two first magnetic elements 230 is described, however the disclosure is not limited thereto. The supporting structure 210 includes a body 211 and a shell 212. The body 211, for example, is an integrally formed sheet metal structure and assists in lowering manufacturing costs. Furthermore, a material of the body 211 may be galvanized steel plate (SAC), or made up of other suitable metal material which allows the first magnetic elements 230 to be attracted on top thereof. That is to say, when the first magnetic elements 230 are assembled on the body 211, the first magnetic elements 230 may be made to attract directly on to the body 211 without requiring coating or attaching adhesives.

The shell 212 covers the body 211, wherein the hooks 220 are disposed on the body 211 and extrude out of the supporting surface 212a of the shell 212. More specifically, the hooks 220, for example, are locked at two opposite sides of the body 211, and the first magnetic elements 230 are located between the two hooks 220. The first magnetic elements 230 are disposed on the body 211 and located in the shell 212. That is to say, the first magnetic elements 230 are not exposed to the external appearance of the docking station 200. Compared to conventional techniques, the external appearances of the docking station 200 only has hooks 220 extruding out of the shell 212, therefore the appearance of the docking station 200 is simplified.

The hooks 220 are disposed corresponding to the respective slots 22 and adapted to inlay in the slots 22, and the first magnetic elements 230 are adapted to attract the portable electronic device 20 so as to fix the portable electronic device 20 on the supporting structure 210. More specifically, the portable electronic device 20 has at least one second magnetic element 23 correspondingly disposed. Because the present embodiment describes an example with two first magnetic elements 230, therefore the number of the second magnetic elements 23 correspondingly disposed is two. The first magnetic elements 230 and the corresponding second magnetic elements 23 are magnetically attracted to each other, such that the portable electronic device 20 is able to be thinly fix on the supporting structure 210, preventing the portable electronic device 20 from producing swinging during user operation, increasing the comfort of user operation.

Referring to FIG. 4 and FIG. 5, in the present embodiment, the docking station 200 further includes a first port 240. The first port 240 protrudes from the supporting surface 212a, wherein when the portable electronic device 20 is installed on the supporting structure 210, the first port 240 is connected to a second port 24 of the portable electronic device 20. Generally speaking, the first port 240 and the second port 24, for example, are universal serial buses (USB), and may be used for power transmission or telecommunication between the docking station 200 and the portable electronic device 20.

On the other hand, the docking station 200 further includes a host 250, wherein the first port 240 is electrically connected to the host 250. A keyboard set 251 is disposed on the host 250 and acts as a physical input interface, operated by the user. The host 250 is pivoted to the supporting structure 210, such that the portable electronic device 20 installed on the supporting structure 210 is adapted to rotate with the supporting structure 210 relative to the host 250, further providing the user with different viewing angles. As shown in FIG. 6, the docking station 200 further includes two pivoting components 260. The pivoting components 260 are connected between the body 211 and the host 250, to act as an interlocking mechanism for the host 250 and the supporting structure 210 to rotate relatively. The hooks 220 and the first magnetic elements 230 are located between the two pivoting components 260 and the first port 240 is located between the two first magnetic elements 230.

When the portable electronic device 20 is installed on the supporting structure 210, the display surface 21 is perpendicular to the supporting surface 212a, and the display surface 21 may face or face back toward the input interface (namely the keyboard set 251) of the host 250. Here, the display surface 21 is shown to face the input interface (namely the keyboard set 251) of the host 250 as an example for description. In other words, the user may install the portable electronic device 20 on the docking station 200 selectively in a manner with the display surface 21 of the portable electronic device 20 facing or facing back toward the keyboard set 251 of the host 250 depending on needs, therefore providing the user flexibility in operation.

In summary, the docking station of the disclosure includes at least one hook and at least one magnetic element, wherein the hook and the magnetic element are disposed on a body and the hook extrudes out of a shell covering the body. When the portable electronic device inlays together with the hook of the body via a slot, the first magnetic element attracts the portable electronic device. That is to say, the portable electronic device may be firmly installed on the docking station through the hook and the first magnetic element. Wherein, a supporting structure is an integrally formed sheet metal structure and assists in lowering manufacturing costs. Compared to conventional techniques, the external appearances of the docking station of the disclosure only has hooks extruding out of the shell, therefore the appearance of the docking station is simplified. On the other hand, a user may install the portable electronic device on the docking station selectively in a manner with the display surface of the portable electronic device facing or facing back toward the input interface of the host depending on needs, therefore, providing the user flexibility in operation.

It will be apparent to those skilled in the art that various modifications and variations can be made to the structure of the present disclosure without departing from the scope or spirit of the disclosure. In view of the foregoing, it is intended that the present disclosure cover modifications and variations of this disclosure provided they fall within the scope of the following claims and their equivalents.

What is claimed is:

1. A docking station, for installing a portable electronic device, the portable electronic device has a display surface and at least one slot located at one side of the display surface, the docking station comprising:
   a supporting structure, comprising a body and a shell, in which the shell covers the body;
   at least one hook, disposed on the body, and extruding out of a supporting surface of the shell; and
   at least one magnetic element, disposed on the body and located in the shell, the at least one hook is adapted to inlay in the at least one slot, and the at least one first magnetic element is adapted to attract the portable electronic device, such that the portable electronic device is fixed on the supporting structure.

2. The docking station as claimed in claim 1, further comprising:
   a host, pivoted to the supporting structure such that the portable electronic device installed on the supporting structure is adapted to rotate with the supporting structure relative to the body.

3. The docking station as claimed in claim 2, further comprising:

two pivoting components, connected between the body and the host, wherein the at least one hook and the at least one magnetic element are located between the two pivoting components.

4. The docking station as claimed in claim 1, wherein the at least one first magnetic element and at least one second magnetic element of the portable electronic device are correspondingly disposed to be magnetically attracted to each other.

5. The docking station as claimed in claim 1, further comprising:
   a first port, protruding from the supporting surface, wherein when the portable electronic device is installed on the supporting structure, the first port and a second port of the portable electronic device are connected.

6. The docking station as claimed in claim 5, wherein the first port and the second port are universal serial buses.

7. The docking station as claimed in claim 1, wherein when the portable electronic device is installed on the supporting structure, the display surface is perpendicular to the supporting surface.

8. The docking station as claimed in claim 1, wherein a number of the at least one hook is two, and a number of the at least one slot is two, the hooks are locked at two opposite sides of the body, and correspondingly disposed with each of the slots respectively, wherein the at least one magnetic element is located between the two hooks.

9. The docking station as claimed in claim 1, wherein the body is galvanized steel plate.

10. The docking station as claimed in claim 1, wherein the body is integrally formed.

\* \* \* \* \*